G. E. EVITTS AND W. GOETTLICH.
TUBE CLAMP.
APPLICATION FILED OCT. 31, 1918.

1,330,523.

Patented Feb. 10, 1920.

Witnesses

Inventor
G. E. Evitts
W. Goettlich

By
Attorneys

UNITED STATES PATENT OFFICE.

GEORGE E. EVITTS AND WALTER GOETTLICH, OF WATERBURY, CONNECTICUT.

TUBE-CLAMP.

1,330,523. Specification of Letters Patent. Patented Feb. 10, 1920.

Application filed October 31, 1918. Serial No. 260,480.

*To all whom it may concern:*

Be it known that we, GEORGE E. EVITTS and WALTER GOETTLICH, citizens of the United States, residing at Waterbury, in the county of New Haven, State of Connecticut, have invented certain new and useful Improvements in Tube-Clamps; and we do hereby declare the following to be a full, clear, and exact description of the invention, such as will enable others skilled in the art to which it appertains to make and use the same.

This invention relates to new and useful improvements in clamps and particularly to clamps used in pinching the rubber tube of a fountain syringe to cut off the flow of water therethrough.

One object of the present invention is to provide a novel and improved device which is capable of easily cutting off the flow of water through the pipe, and which can be readily and conveniently grasped and operated by one hand.

Another object is to provide a novel and improved device of this character wherein the flow of water through the tube can be controlled and permitted to flow at different speeds and volumes.

Other objects and advantages will be apparent from the following description when taken in connection with the accompanying drawing.

Figure 1:
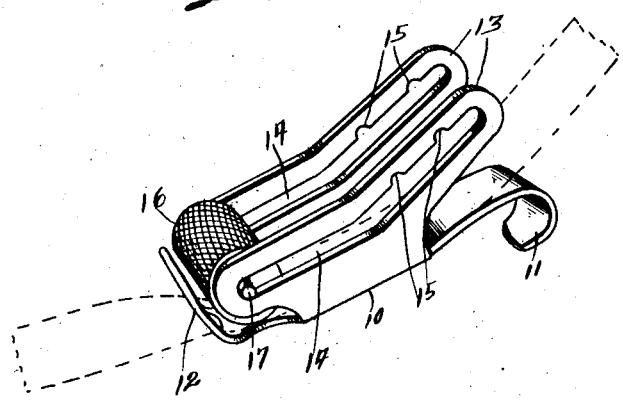
Figure 1 is a perspective view of the device in fully closed position, the pipe being shown in dotted lines.
Figure 2:
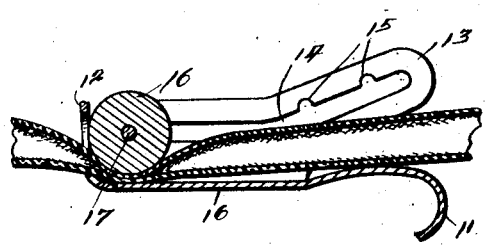
Fig. 2 is a vertical longitudinal sectional view through the device and the hose or pipe, showing the device in its fully closed position.
Figure 3:
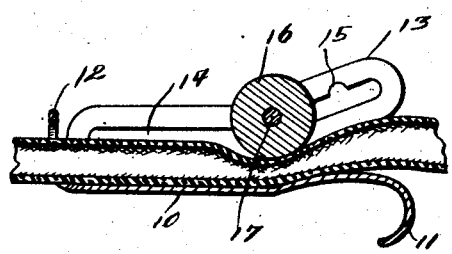
Fig. 3 is a similar sectional view showing the device in one of its adjusted positions.

Referring particularly to the accompanying drawing, there is shown the frame of the device which is formed from a single metal blank. This frame includes the base portion 10 from one end of which there extends the hook-shaped finger piece 11, and from the other end the upwardly turned ring portion 12. From the opposite sides of the base portion there extend the parallel side members 13 each of which is formed with an angular longitudinally extending slot 14. In one wall, preferably the upper wall of the inner end of the slot, there are formed the two or more notches 15, the purpose of which will presently appear. Disposed transversely between the side members 13 is an externally scored or roughened roller 16, having the trunnions 17 which are engaged in the said slots 14. Through the ring member 12 and between the base member 10 and the roller, the hose or rubber pipe of the syringe is disposed, the roller bearing against the said pipe, as will be readily understood.

It will be noted that the portion of the slot of each side member of the frame converges toward the base member in a direction toward the ring member 12, whereby when the roller is moved to dispose its trunnions in said portion of the slot, the roller will squeeze the hose between it and the base member to such a degree that the flow of liquid through the pipe will be stopped. When, however, it is desired to regulate the flow, so that a stream of the required volume and speed will be produced, the roller is moved so as to engage its trunnions in one or the other of the sets of notches 15. The pressure of the hose and fluid therein will serve to hold the trunnions in said notches without the necessity of holding the same with the fingers of the hand of the operator.

By engaging one finger with the hook 11, the thumb of the hand can engage the roller so that the same may be pushed along the slots into engagement with the notches, or into the other end portion of the slot. By pressure of the back of the finger against the finger piece and rolling the roller with the thumb, the roller may be released from its advanced positions.

What is claimed is:

1. A cut-off and controlling device for a syringe hose including a frame having a clamping surface, a finger piece on one end of the frame, and a hose engaging roller carried by the frame and rotatable into and out of clamping relation to said clamping surface, said roller being exposed for superficial manipulation.

2. A cut-off and controlling device for a syringe hose including a frame having side and bottom members, a fingerpiece on one end of the frame, and a clamping roller journaled in the side members, and exposed for superficial manipulation.

3. A cut-off and controlling device for a syringe hose including a frame having parallel side members formed with longitudinal angular slots, one wall of each of the slots being formed with notches, one portion of each of the slots being disposed in convergent relation with the base portion of the frame, a fingerpiece at one end of the base portion, and a superficially exposed clamping roller disposed between the side members and having trunnions movable in the said slots and arranged to engage in said notches.

4. A cut-off and controlling device for a syringe hose including a frame having a clamping surface, and a hose engaging roller carried by the frame and rotatable into and out of clamping relation to said clamping surface, said roller being exposed for superficial manipulation.

In testimony whereof, we affix our signatures, in the presence of two witnesses.

GEORGE E. EVITTS.
WALTER GOETTLICH.

Witnesses:
ANNABEL C. RILEY,
MARION WHITE.